(12) United States Patent
Schulze

(10) Patent No.: US 10,084,303 B2
(45) Date of Patent: Sep. 25, 2018

(54) COMBINER BOX HAVING MOTORIZED OVERCURRENT PROTECTION

(71) Applicant: SMA Solar Technology AG, Niestetal (DE)

(72) Inventor: Gerold Schulze, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 15/497,673

(22) Filed: Apr. 26, 2017

(65) Prior Publication Data

US 2017/0229856 A1 Aug. 10, 2017

Related U.S. Application Data

(63) Continuation of application No. PCT/EP2015/073816, filed on Oct. 14, 2015.

(30) Foreign Application Priority Data

Oct. 27, 2014 (DE) ........................ 10 2014 115 601

(51) Int. Cl.
*H02H 3/08* (2006.01)
*H02S 40/32* (2014.01)
(Continued)

(52) U.S. Cl.
CPC ................ *H02H 3/08* (2013.01); *H02H 7/20* (2013.01); *H02S 40/32* (2014.12); *H02S 40/36* (2014.12)

(58) Field of Classification Search
USPC ....................................................... 361/93.1
See application file for complete search history.

(56) References Cited

U.S. PATENT DOCUMENTS 8,217,534 B2 * 7/2012 Sok .......................... H02J 3/383
                                                        136/243
8,558,709 B2 * 10/2013 Schripsema ...... H01L 31/02021
                                                        340/636.1
(Continued)

FOREIGN PATENT DOCUMENTS

DE      102008008505 A1    8/2009
DE      202012007257 U1   10/2013
(Continued)

OTHER PUBLICATIONS

International Search Report dated Dec. 23, 2015 for International Application No. PCT/EP2015/073816.

*Primary Examiner* — Ronald W Leja
(74) *Attorney, Agent, or Firm* — Eschweiler & Potashnik, LLC

(57) ABSTRACT

The disclosure relates to a combiner box including input connections for string lines from a plurality of strings of photovoltaic modules, and output connections for a pair of output lines to an inverter. The combiner box further includes a switching device by means of which the strings are connected to the inverter and which comprises output-side switching contacts and, for each of the strings or for each pair of strings connected in parallel in a fixed manner in the combiner box, at least one separate input-side switching contact, and an overcurrent protection device, which interrupts overcurrents occurring from or to each of the strings or at least from or to each of the pairs of strings connected in parallel in a fixed manner in the combiner box. The switching device includes a switching-contact drive, which is controlled in order to selectively disconnect the strings from the inverter.

14 Claims, 2 Drawing Sheets

(51) Int. Cl.
*H02S 40/36* (2014.01)
*H02H 7/20* (2006.01)

(56) References Cited

U.S. PATENT DOCUMENTS

| | | | |
|---|---|---|---|
| 9,589,752 B2* | 3/2017 | Solon | H01H 47/002 |
| 2006/0237058 A1 | 10/2006 | McClintock et al. | |
| 2007/0107767 A1 | 5/2007 | Hayden et al. | |
| 2011/0141644 A1* | 6/2011 | Hastings | H01L 31/02021 |
| | | | 361/93.2 |
| 2011/0301772 A1* | 12/2011 | Zuercher | H02H 7/20 |
| | | | 700/293 |
| 2012/0024337 A1* | 2/2012 | Bellacicco | H02S 40/36 |
| | | | 136/244 |
| 2012/0126626 A1* | 5/2012 | Falk | H02J 1/10 |
| | | | 307/80 |
| 2013/0050906 A1 | 2/2013 | Peplinski et al. | |
| 2013/0139384 A1* | 6/2013 | Abroy | H01L 31/02021 |
| | | | 29/854 |
| 2013/0264883 A1* | 10/2013 | Bhavaraju | H02J 3/383 |
| | | | 307/80 |
| 2015/0179363 A1* | 6/2015 | Wiersch | H01L 31/02021 |
| | | | 200/51 R |

FOREIGN PATENT DOCUMENTS

| | | |
|---|---|---|
| EP | 2282388 A1 | 2/2011 |
| WO | 2006078685 A2 | 7/2006 |
| WO | 2007048421 A2 | 5/2007 |
| WO | 2013081851 A1 | 6/2013 |

* cited by examiner

COMBINER BOX HAVING MOTORIZED OVERCURRENT PROTECTION

REFERENCE TO RELATED APPLICATIONS

This application is a Continuation of International application number PCT/EP2015/073816 filed on Oct. 14, 2015, which claims priority to German Application number 10 2014 115 601.3 filed on Oct. 27, 2014. The contents of the above-identified matters are hereby incorporated by reference in their entirety.

FIELD

The disclosure relates to a combiner box having input connectors for string lines from multiple strings of photovoltaic modules and output connectors for a pair of output lines to an inverter. In such a combiner box, the multiple strings of photovoltaic modules are connected in parallel and connected to the output connectors.

BACKGROUND

DE 10 2008 008 505 A1 discloses a combiner box comprising busbars to which the input connections for each string of photovoltaic modules are connected via disconnecting switches and a fusible link in one of the input connections. The busbars are connected to the output lines via a disconnecting switch. In order to be able to disconnect or connect the individual strings using a control unit, the disconnecting switches are connected in series with electronic switching elements between the input connections and the busbar. Furthermore, a current measuring unit for detecting a respective string current is connected in series with the respective electronic switching element. The control unit actuates the respective electronic switching element to disconnect the associated string if a respective detected string current measured value exceeds a prescribed comparison value. Typically, the comparison value is stipulated at a current value that is greater than 1.4 times the rated value of a photovoltaic module. Conventional fusible links are designed for higher values in order to prevent erroneous tripping of the fuse, e.g. as a result of aging, as a result of a temperature increase during operation and as a result of insolation peaks arising at a cloud speed of up to over 140% of the rated value. The advantages of the electronic fuses provided by the electronic switching elements in conjunction with the current measuring units and the control unit are their fast reaction to exceedances of the prescribed comparison value by the string current that arise and the fact that a tripped electronic fuse can be reconnected. The electronic switching elements arranged permanently in the flow of current from the individual strings to the busbars cause permanent power losses, however, and are a significant cost factor particularly when many strings are connected in parallel in a combiner box, particularly together with the fusible links that continue to be present.

US 2007/0107767 A1 discloses a further combiner box. In this case, busbars are connected directly to the output connections. Input connections for a respective string are connected to the busbars via a fusible link, a measuring device and a switching device. The measuring device measures a string current, and the switching device disconnects or connects the respective string. A control device evaluates the string currents and controls the switching devices. The control device can also be actuated by means of a remote control in order to operate the switching devices to connect or disconnect the strings. The switching devices may be actuatable switches or relays. A multiplicity of strings interconnected via the combiner box require many fusible links and relays to be provided in the combiner box, which signify a high overall cost involvement.

US 2006/0237058 A1 discloses a combiner box for which, in one input connection for each string, a fusible link is connected in series with a measuring device and a semiconductor switch. In the respective other input connection, a further measuring device is provided. The signals from the measuring devices are taken as a basis for ascertaining string currents, and these in turn are taken as a basis for actuating the semiconductor switches.

EP 2 282 388 A1 discloses an apparatus for supplying electric power from a multiplicity of strings of photovoltaic modules to a grid. In this case, multiple strings are respectively connected in parallel via a combiner box with protection by fusible links. For the output lines of each combiner box, an inverter has a separate connection provided on it, in which means for overcurrent protection and for selectively disconnecting the combiner box are provided. These means have a circuit breaker that can be opened and closed by motor. The circuit breaker is connected in series with a current measuring device in the connection. The means for overcurrent protection in the inverter have no fusible link.

WO 2007/048421 A2 discloses a switch fuse with control for solar cells. This is an electrical circuit arrangement for controlling the output of at least one of multiple strings, connected in parallel with one another using buslines, of photovoltaic modules. For the string, the circuit arrangement comprises a mechanical switch in order to interrupt one of the connecting lines of the string, a measuring device for measuring the current flowing through the string and a controller for receiving a signal from the measuring device and for controlling the mechanical switch. The controller is provided in order to open the mechanical switch if the current is not within prescribed limits.

WO 2013/081851 A1 discloses a combiner box having an input-side protection device that uses a protective switch or a fuse to automatically open the respective circuits affected by fault conditions, such as a ground fault or an overcurrent fault. All output connections of the protection apparatus are connected to a busline that can be connected to one of the output connections of the combiner box via a disconnecting apparatus.

US 2013/0050906 A1 discloses the practice of connecting multiple input and output lines to a central switch in the case of a safety device connected downstream of multiple combiner boxes as an alternative to a plurality of individual switches that can each be operated using a switch lever.

SUMMARY

The disclosure is directed to a combiner box that is inexpensive to produce despite the integration of high safety functions.

A combiner box according to the disclosure has input connectors for string lines from multiple strings of photovoltaic modules, output connectors for a pair of output lines connected to an inverter, a switching device that can be used to connect the strings to the inverter, and an overcurrent protection device. The switching device comprises output-side switching contacts and, for each of the strings or at least for each pair of strings permanently connected in parallel in the combiner box, at least one separate input-side switching contact. Furthermore, the switching device comprises a switching contact drive that can be actuated in order to disconnect the strings from the inverter. The overcurrent protection device interrupts overcurrents arising from or to each of the strings or at least from each of the pairs of strings permanently interconnected in the combiner box. To this end, it comprises current sensors that measure the current flowing from or to each of the strings or at least from or to each of the pairs of strings permanently connected in parallel in the combiner box; and it is configured such that, in the case of a measured current that exceeds an overcurrent limit, it actuates the switching contact drive in order to disconnect from the inverter at least the string or the pair of strings from or to which the current exceeding the overcurrent limit flows. This disconnect switching action disconnects the current source that drives the current exceeding the overcurrent limit. According to the disclosure, the switching drive has a common movement drive for multiple switching contacts that are associated with multiple strings or multiple pairs of strings permanently connected in parallel in the combiner box.

In the case of a combiner box according to the disclosure, the switching contact drive does not comprise separate movement drives for each pair comprising an input-side switching contact and the associated output-side switching contact. There is also one common movement drive for the switching contacts arranged in both input lines of a string or of a pair of strings for the purpose of all-polarity disconnection of the respective string or pair. Rather, each movement drive of the switching contact drive is provided, in the case of the combiner box according to the disclosure, for the switching contacts associated with multiple strings or pairs of strings. Accordingly, these strings can be disconnected from the inverter only collectively using the common drive. The absence of separate movement drives of the switching contact drive for each individual string provides considerable potential for cost savings in comparison with a switching device having a relay for each individual string, for example, particularly if the number of strings or pairs of strings for which a common movement drive is provided is at least five and particularly at least ten.

Specifically, the common movement drive can move a common contact element having the output-side switching contacts for all input-side switching contacts of the same polarity that are associated with the multiple strings or with the multiple pairs of strings. In that case, the output-side switching contacts of the multiple strings or pairs of strings are not only mechanically coupled via the movement drive, but rather, in so far as they are associated with same-polarity input-side switching contacts of the strings or pairs of strings, are produced on a contact element that is moved as a unit by the common movement drive.

Alternatively, the common movement drive having a common operating element, such as e.g. an insulated shaft, can move the input-side switching contacts for some or all same-polarity input-side switching contacts that are associated with the multiple strings or the multiple pairs of strings.

In the case of the combiner box according to the disclosure, the common movement drive can move a single common contact element having output-side switching contacts for all same-polarity separate input-side switching contacts of the strings or of the pairs of strings. That is to say that the switching contact drive can have a single movement drive for all strings, wherein, for the purpose of single-polarity isolation of the strings, it moves a single common contact element having output-side switching contacts for all same-polarity input-side switching contacts, and for the purpose of dual-polarity isolation, two common contact elements having output-side switching contacts for the respective same-polarity input-side switching contacts.

In the case of a combiner box according to the disclosure, additional fuses, in particular fusible links, are dispensed with in one embodiment. Instead, the parts of the overcurrent protection device that are arranged in the combiner box and connected in or between the string lines and the output lines are limited to the current sensors and the switching contacts. In this way, an additional cost saving is achieved for the combiner box according to the disclosure. The series circuits known from the prior art comprising a fusible link and a relay for each string, cf. US 2007/0107767 A1, are, by contrast, very much more expensive without an increased level of overcurrent safety being achieved in practice.

As has already been indicated, the switching device of the combiner box according to the disclosure can disconnect each of the strings or at least each pair of strings from the inverter in all polarities.

In one embodiment the current sensors of the combiner box according to the disclosure measure the current flowing from each of the strings even if pairs of strings are permanently connected in parallel in the combiner box in order to achieve an increased degree of overcurrent safety.

The entire switching device of the combiner box according to the disclosure may be of the normally open type, i.e. when an actuating signal is not applied to the switching device, the latter disconnects the strings from the inverter. This ensures that the strings are disconnected from the inverter in the event of failure of the overcurrent protection device and accordingly loss of the actuation of the switching device.

In principle, the common movement drive of the switching contact drive may comprise a spring drive that is actuatable only in order to disconnect the associated strings from the inverter. The spring drive is tensioned by manually connecting the strings to the inverter via the switching device. The spring drive is tripped by the overcurrent protection device when overcurrents occur. Reconnecting the strings to the inverter then requires manual intervention in the combiner box, if the movement drive comprises only the spring drive. In principle, however, even if the common movement drive comprises a spring drive, there may additionally be a motor drive provided that can be actuated in order to connect the associated strings to the inverter. In this case the spring drive for isolating the strings from the inverter can be tensioned by the motor drive when the strings are connected to the inverter. In one embodiment, if a motor drive is present it is also actuated by the overcurrent protection device for the purpose of disconnecting the associated strings from the inverter, however.

The combiner box according to the disclosure may have a signal input for a disconnecting signal from the inverter, wherein the switching device is designed such that, on arrival of the disconnecting signal, it actuates each common movement drive in order to disconnect the strings from the inverter. The corresponding form of the switching device can include parts of the overcurrent protection device in the combiner box. As a result the combiner box according to the disclosure being configured for disconnecting the strings from the inverter on a signal from the inverter, it can also replace fuses and additional disconnecting switches in the inverter that are usually part of an overall overcurrent safety apparatus including the inverter. This achieves additional cost advantages.

If the common movement drive of the combiner box according to the disclosure comprises a motor drive, it may additionally have a signal input for a connecting signal from the inverter, and the switching device can be designed such that, on arrival of the connecting signal, it actuates each common movement drive in order to connect the strings to the inverter. The signal input for the connecting signal can fundamentally have the same signal input as that for the disconnecting signal. In particular, this may be an interface for a wired input, a powerline communication signal modulated onto the output lines or a wireless signal. This interface can also be used for other communication between the inverter and the combiner box according to the disclosure.

A combiner box according to the disclosure may comprise not only the devices described here but also an integrated DC/DC controller.

A photovoltaic installation according to the disclosure comprises an inverter, multiple strings of photovoltaic modules, connected in parallel via at least one combiner box, and current sensors that are used to measure the current flowing from each of the combiner boxes to the inverter, the combiner boxes being combiner boxes according to the disclosure comprising a signal input for the disconnecting signal from the inverter. In the case of a measured current exceeding a second overcurrent limit, the inverter outputs the disconnecting signal at least to the combiner box from which the current that exceeds the second overcurrent limit flows. In the case of a photovoltaic installation of this type according to the disclosure, the parts of a DC-side overall overcurrent safety apparatus, comprising the overcurrent protection devices of the combiner boxes, that are arranged in the inverter and connected in or between the output lines of each combiner box consist exclusively of the current sensors in one embodiment. That is to say that, to ensure overcurrent safety, there are no fusible links or other fuses or disconnecting switches actuatable in the event of overcurrent provided in the inverter.

Advantageous developments of the disclosure will emerge from the patent claims, the description and the drawings. The advantages cited in the description for features and for combinations of multiple features are merely exemplary and can take effect alternatively or cumulatively without the advantages necessarily having to be attained by embodiments according to the disclosure. Without this altering the subject matter of the accompanying patent claims, the following applies in respect of the disclosure content of the original application documents and the patent: further features can be found in the drawings—particularly the relative arrangement and operative connection of multiple components. The combination of features of different embodiments of the disclosure or of features of different patent claims is likewise possible as a departure from the chosen back-references of the patent claims and is suggested hereby. This also relates to such features as are depicted in separate drawings or are cited in the description thereof. These features can also be combined with features of different patent claims. Similarly, features presented in the patent claims can be dropped for further embodiments of the disclosure.

In terms of their number, the features cited in the patent claims and the description can be understood to mean that precisely this number or a larger number than the cited number is present, without there being any need for explicit use of the adverb "at least". Thus, if reference is made to one current sensor, for example, then this can be understood to mean that precisely one current sensor, two current sensors or more sensors are present. These features can be supplemented by other features or may be the only features of which the respective product consists.

The reference symbols that the patent claims contain are not a restriction for the scope of the subjects protected by the patent claims. They merely serve the purpose of making the patent claims easier to understand.

BRIEF DESCRIPTION OF THE DRAWINGS

The disclosure is explained further and described below using exemplary embodiments depicted in the figures.

DETAILED DESCRIPTION

The disclosure relates to a combiner box having input connectors for string lines from multiple strings of photovoltaic modules and output connectors for a pair of output lines to an inverter. In such a combiner box, the multiple strings of photovoltaic modules are connected in parallel and connected to the output connectors.

In this case, a switching device can be used to connect the input connectors to the output connectors, i.e. the strings to the inverter, comprising at least one separate input-side switching contact for each of the strings or at least for each pair of strings permanently connected in parallel in the combiner box. As the strings are not yet or no longer connected via the switching device, the strings are therefore disconnected not only from the inverter but also from one another. At most, the pairs that are permanently connected in parallel in the combiner box are still connected to one another after being disconnected from the inverter. This ensures that no damage to the individual strings of photovoltaic modules arises as a result of currents generated by other strings of photovoltaic modules, which currents flow in the opposite direction through a string and hence through each of its photovoltaic modules in the extreme case. The admissibility of the permanent parallel connection of two strings in the combiner box is based on the fact that it is normally uncritical for a photovoltaic module if it routes the current generated by only one other photovoltaic module of the same type in the opposite direction.

Figure 1:
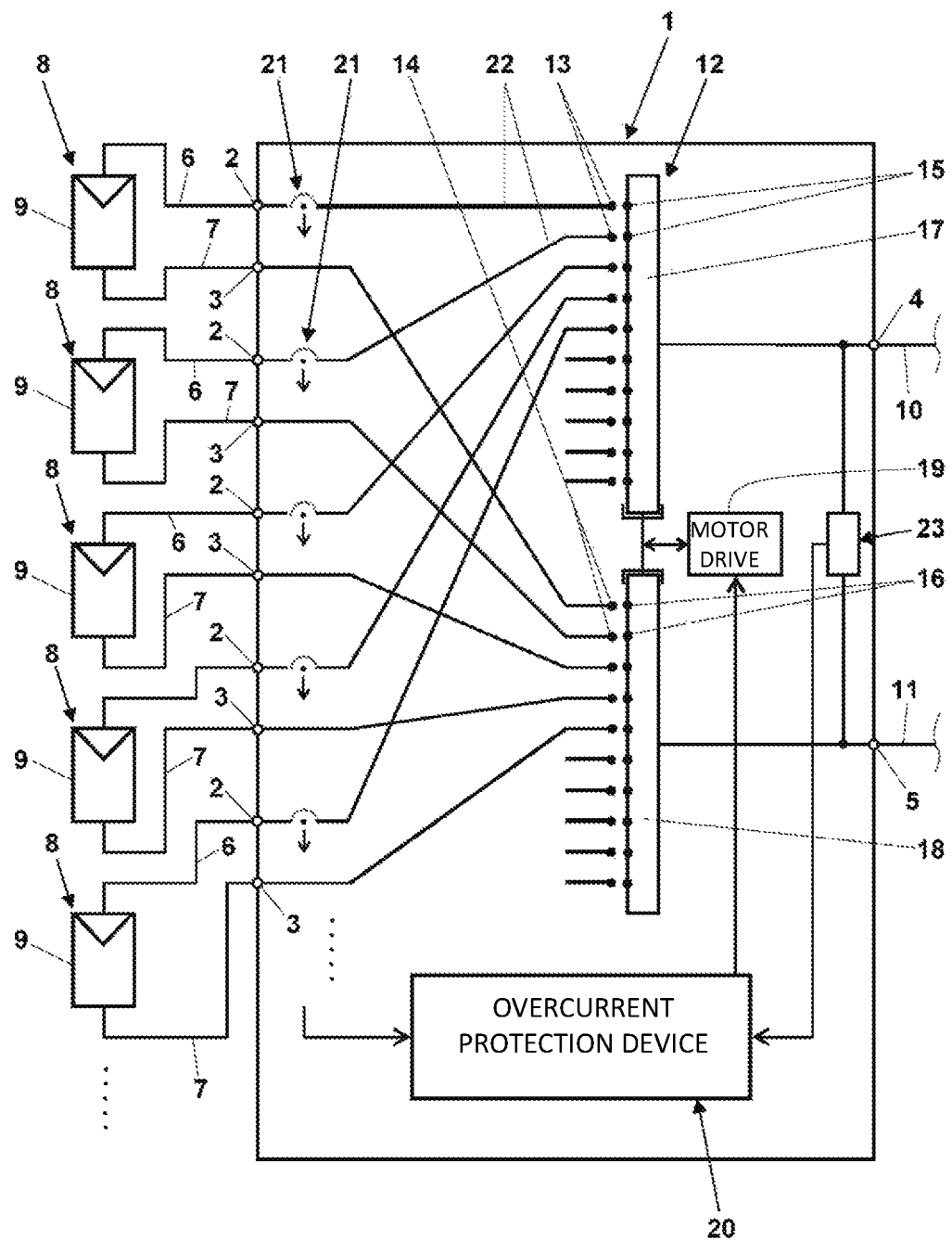
FIG. 1 illustrates a combiner box according to the disclosure with connected strings of photovoltaic modules.

The combiner box 1 shown in FIG. 1 has a multiplicity of input connectors 2 and 3 and a pair of output connectors 4 and 5. Each pair of input connectors 2 and 3 is provided for two string lines 6 and 7 in order to connect a string 8 of photovoltaic modules 9 to the combiner box 1. In FIG. 1, only one photovoltaic module 9 is shown for each string 8. Typically, however, each string 8 comprises a series connection containing a multiplicity of photovoltaic modules 9. The number of input connectors 2 and 3 of the combiner box 1 is also depicted in FIG. 1 to be smaller than frequently implemented. As such, there may be input connectors for 10, 20, 40 or even more strings 8. The output connectors 4 and 5 are provided for a pair of output lines 10 and 11 for connecting the combiner box to an inverter, which is depicted in FIG. 2.

In the combiner box 1, the strings 8 are connected in parallel with one another to the output connectors 4 and 5. To this end, a switching device 12 has input-side contact elements 13 and 14 that are associated with the individual input connectors 2 and 3, respectively. FIG. 1 depicts 10 input-side switching contacts 13 and 14 in each case. In this respect, the switching device 12, as depicted, is provided for 10 strings. Output-side switching contacts 15 and 16 of the switching device 12 are formed on two contact elements 17 and 18. In this case, all output-side switching contacts 15, which are associated with the input-side switching contacts 13 of the same polarity, are provided on the contact element 17, and all output-side switching contacts 16, which are associated with the input-side switching contacts 14 of the same polarity, are provided on the contact element 18. The contact elements 17 and 18 are connected to the two output connectors, and they are collectively movable with a motor drive 19 toward the input-side switching contacts 13 and 14 and away therefrom in order to connect the output-side switching contacts 15, 16 to the input-side switching contacts 13, 14 and to disconnect them therefrom again. Alternatively, the input-side switching contacts 13 and 14 can also be moved toward the output-side switching contacts 15 and 16 and away therefrom, for example by means of an electrically insulated operating element, or an operating element formed from electrically insulating material. The motor drive 19 is actuated by an overcurrent protection device 20. The overcurrent protection device 20 comprises current sensors 21 in connecting lines 22 between the input connectors 2 and the input-side switching contacts 13. The current sensors 21 detect the current flowing in the respective string 8. If one of these currents exceeds an overcurrent limit, the overcurrent protection device 20 actuates the motor drive 19 or a mechanical energy storage device, not depicted separately here, for example using a spring pretensioned by the motor drive, such that said motor drive or energy storage device removes the contact elements 17 and 18 with the output-side switching contacts 15 and 16 from the input-side switching contacts 13 and 14. As a result, all strings 8 are disconnected from the output connectors 4 and 5 and also from one another. This interrupts the current exceeding the overcurrent limit. The overcurrent protection device additionally has an interface 23 for a powerline communication via the connecting lines 10 and 11 with the inverter connected thereto. The inverter can transmit a connecting signal, as a result of which the motor drive 19 connects the strings 8 to the inverter by moving the contact elements 17 and 18 to connect the output-side switching contacts 15, 16 to the input-side switching contacts 13, 14. Similarly, the inverter can also transmit a disconnecting signal, however, as a result of which the motor drive 19 likewise disconnects the strings 8 from the inverter as if the overcurrent protection device 20 uses one of the current sensors 21 to measure an overcurrent through one of the connecting lines 22.

It is self-evident that the individual switching contacts 13 are at such a distance from one another or isolated from one another by insulators such that the removal of the contact elements 15 and 16 isolates the input-side switching contacts 13 and 14 from one another to a sufficient extent, so that e.g. it is not possible for what is known as a reverse current to flow from one string 8 via adjacent contacts 13 to another string 8. In addition, it is clear that the motor drive 19 disconnects the contact elements 17 and 18 with the output-side switching contacts 15 and 16 from the input-side switching contacts 13 and 14 to such an extent that any arcs between them are safely quenched. It goes without saying that the common movement drive of the contact elements 17 and 18 with the motor drive 19 does not produce any electrical contact between the contact elements 17 and 18.

Figure 2:
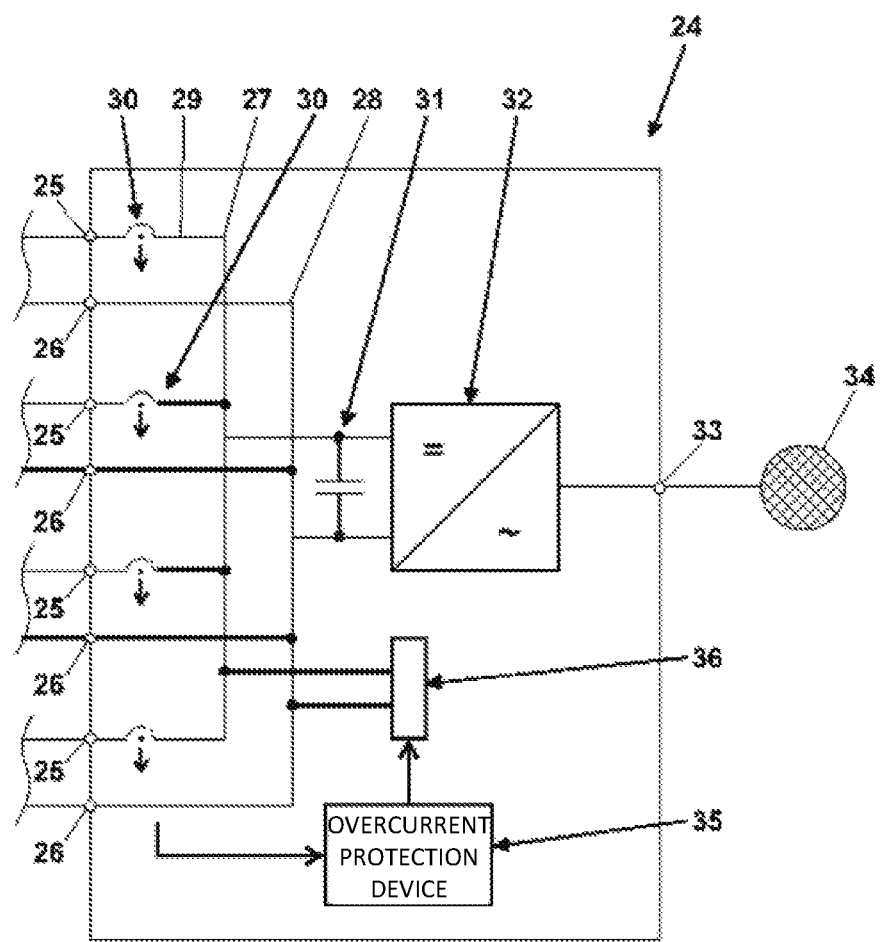
FIG. 2 shows an inverter that, in conjunction with the combiner box 1 shown in FIG. 1, forms a photovoltaic installation according to the disclosure.

The inverter 24 shown in FIG. 2 has pairs of input-side connectors 25, 26 for connecting one combiner box as shown in FIG. 1 each. The combiner boxes are connected in parallel to busbars 27, 28 in the inverter 24. In this case, a current sensor 30 is arranged in each connecting line 29 between each input connector 25 and the busbar 27. The busbars 27 and 28 are connected directly to an input link circuit 31 of a DC/AC converter 32. Via an output connection 33, the DC/AC converter 32 outputs an alternating current to an external AC grid 34. The current sensors 30 are part of an overcurrent protection device 35 of the inverter 24. If one of the current sensors 30 measures a current that exceeds a second overcurrent limit, then the overcurrent protection device 35 uses an interface 36 for powerline communication with the connected combiner boxes to output a disconnecting signal at least to the combiner box in whose connecting line 29 the current exceeding the second overcurrent limit flows, in order to disconnect the strings 8 connected to this combiner box 1 from the combiner box and hence from the inverter 24.

In the case of a photovoltaic installation comprising the inverter 24 shown in FIG. 2 and the multiple combiner boxes 1 as shown in FIG. 1, an overall overcurrent safety apparatus comprising the overcurrent protection devices 20 and 35 in one embodiment consists exclusively of the current sensors 21 and 30 and the switching contacts 13 to 16 for its parts connected to the current-carrying lines. By contrast, there are no fusible links provided, that is to say neither in the combiner box 1 nor in the inverter 24. In addition, the inverter 24 comprises no disconnecting switches used for overcurrent safety for the individual combiner boxes, i.e. the individual pairs of input connectors 25 and 26. However, this does not preclude there being a disconnecting switch, not depicted in FIG. 2, between the busbars 27 and 28 and the DC/AC converter 32.

What is claimed is:

1. A combiner box, comprising:
   multiple pairs of input connectors configured to be coupled to multiple pairs of string lines from multiple respective strings of photovoltaic modules,
   output connectors configured to be coupled to a pair of output lines for connection to an inverter,
   a switching device configured to connect the string lines of the strings via the multiple input connectors and respective connecting lines to the output lines of the inverter via the output connectors, the switching device comprising output-side switching contacts and at least one separate input-side switching contact for each of the respective strings or at least for each pair of strings permanently connected in parallel in the combiner box, and
   an overcurrent protection device configured to interrupt overcurrents in the connecting lines occurring from or to each of the strings or at least from or to each of the pairs of strings permanently connected in parallel in the combiner box,
   wherein the switching device comprises a switching contact drive that is selectively actuated in order to disconnect the strings from the inverter when connected to the multiple input connectors and output connectors, respectively, and
   wherein the overcurrent protection device comprises current sensors measuring the current flowing in the respective connecting lines from or to each of the strings or at least from or to each of the pairs of strings permanently connected in parallel in the combiner box and configured to actuate the switching contact drive in order to disconnect the at least one separate input-side switching contact from the output-side switching contacts, thereby disconnecting from the inverter at least the string or the pair of strings from or to which the current exceeding the overcurrent limit flows in the event of a measured current exceeding an overcurrent limit, wherein the switching contact drive comprises a common movement drive for multiple switching contacts of the at least one separate input-side switching contact and the output-side switching contacts that are associated with multiple strings or multiple pairs of strings permanently connected in parallel in the combiner box.

2. The combiner box as claimed in claim 1, wherein the number of the multiple strings or of the multiple pairs of strings permanently connected in parallel in the combiner box is at least 10.

3. The combiner box as claimed in claim 1, wherein the common movement drive moves a common contact element comprising the output-side switching contacts for all input-side switching contacts of the same polarity that are associated with the multiple strings or with the multiple pairs of strings permanently connected in parallel in the combiner box.

4. The combiner box as claimed in claim 1, wherein the common movement drive moves a common contact element having output-side switching contacts for all same-polarity separate input-side switching contacts of the strings or of the pairs of strings permanently connected in parallel in the combiner box.

5. The combiner box as claimed in claim 1, wherein a part of the overcurrent protection device that is arranged in the combiner box and connected in or between the string lines and the output lines comprise the current sensors and the at least one separate input-side switching contact and the output-side switching contacts.

6. The combiner box as claimed in claim 1, wherein the switching device is configured to disconnect all poles of each of the strings or at least of each pair of strings permanently connected in parallel in the combiner box from the inverter.

7. The combiner box as claimed in claim 1, wherein the current sensors are configured to measure the current flowing from each of the strings.

8. The combiner box as claimed in claim 1, wherein the switching device comprises a normally open type switching device.

9. The combiner box as claimed in claim 1, wherein the common movement drive comprises a spring drive.

10. The combiner box as claimed in claim 1, wherein the common movement drive comprises a motor drive configured to selectively connect the associated strings to the inverter.

11. The combiner box as claimed in claim 10, wherein the switching device is configured to actuate the common movement drive in order to connect the strings to the inverter after receiving a connecting signal from a signal input connected to the inverter.

12. The combiner box as claimed in claim 1, further comprising a signal input for a disconnecting signal from the inverter, wherein the switching device is configured to actuate the common movement drive in order to disconnect the strings from the inverter after receiving a disconnecting signal.

13. The combiner box as claimed in claim 11, wherein the signal input comprises an interface for a wired signal, a powerline communication signal modulated onto the output lines or a wireless signal.

14. A photovoltaic installation comprising one or more combiner boxes as set forth in claim 1, an inverter, and multiple strings of photovoltaic modules connected in parallel via each respective combiner box, further comprising one or more further current sensors arranged in the inverter configured to measure the current flowing from each of the one or more combiner boxes respectively, and wherein in the event of a measured current exceeding a second overcurrent limit, the inverter outputs a disconnecting signal at least to the combiner box from which the current flows that exceeds the second overcurrent limit.

* * * * *